(No Model.) 2 Sheets—Sheet 1.
J. LEEDE.
WATER METER WITH AUTOMATIC GOVERNOR.
No. 252,229. Patented Jan. 10, 1882.
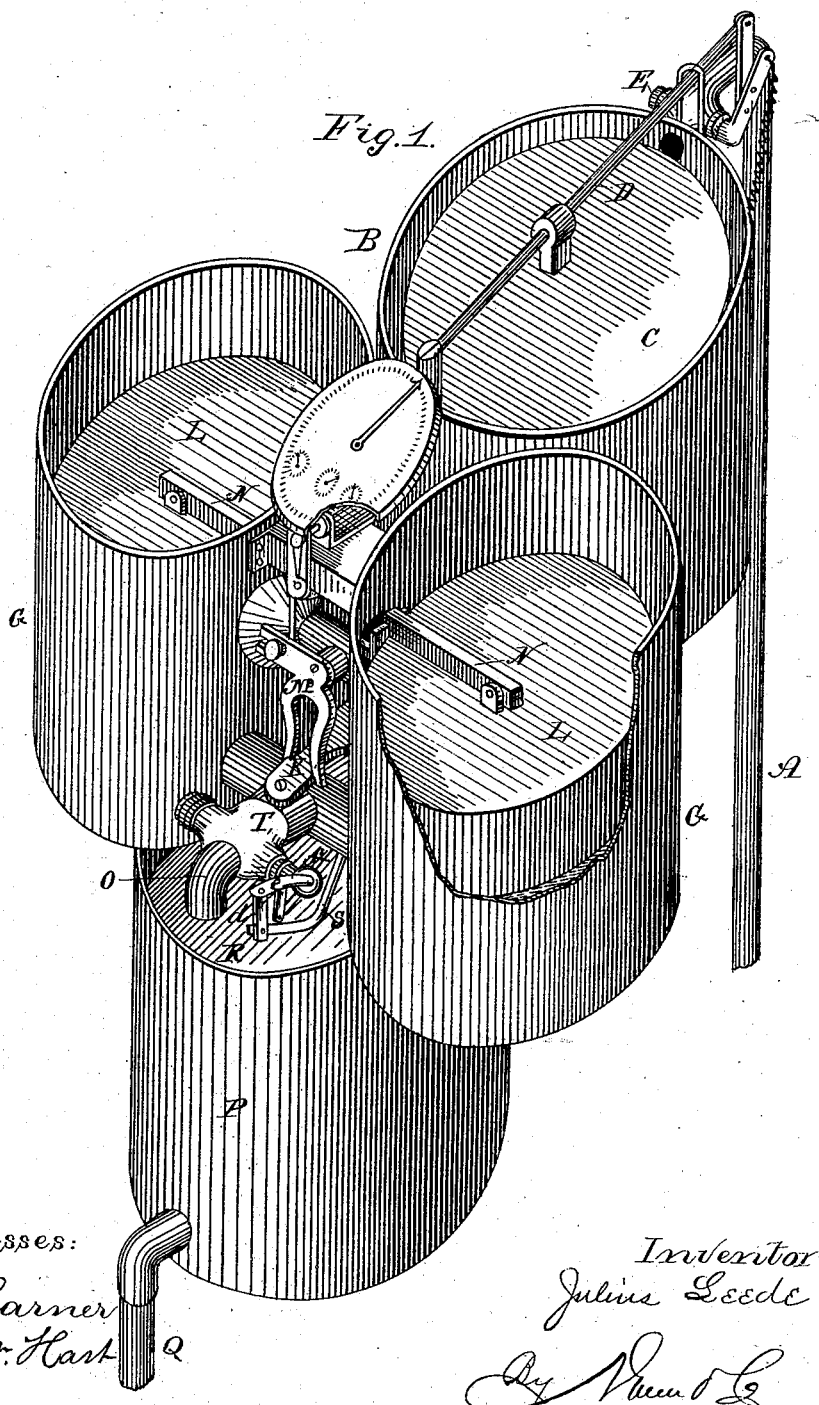

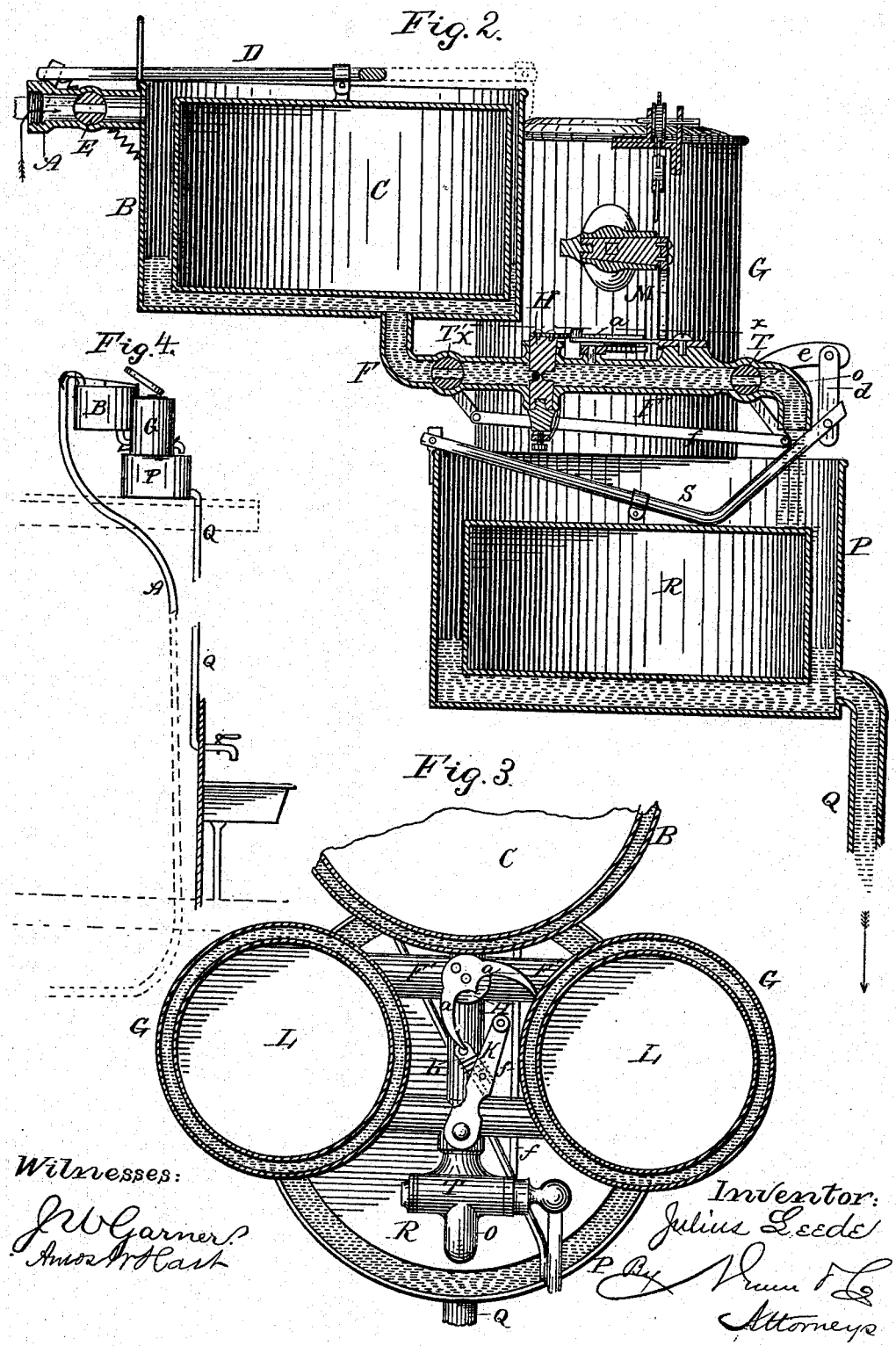

UNITED STATES PATENT OFFICE.

JULIUS LEEDE, OF WASHINGTON, DISTRICT OF COLUMBIA.

WATER-METER WITH AUTOMATIC GOVERNOR.

SPECIFICATION forming part of Letters Patent No. 252,229, dated January 10, 1882.

Application filed June 21, 1881. (No model.)

*To all whom it may concern:*

Be it known that I, JULIUS LEEDE, of Washington city, District of Columbia, have invented a new and Improved Water-Meter; and I do hereby declare that the following is a full, clear, and exact description of the same.

Numerous attempts have been made to provide a water-meter which is reliable and accurate under varying heads or degrees of pressure of water, also not liable to get out of order, and at the same time durable and not too expensive.

It is the object of my invention to furnish a meter which possesses these qualities, and to this end I contemplate one whose operation is not dependent upon any particular head or degree of pressure in the supply-pipe other than that which is requisite to cause a flow or movement of the water when required, it being in this respect distinguished from the meters usually employed.

The operation of my improved meter depends upon the buoyancy of the water, which, acting upon floats, causes them to rise and fall and operate registering mechanism according to the quantity of water passed through and discharged from the meter. No head or pressure of water being required, the meter is in practice located in the upper portion of the dwelling or other building to which water is supplied, and the pressure at the several discharge-spigots is therefore such as is due to the height of the column, or, in other words, to the vertical distance between the meter and the spigots.

The principal feature of the invention is the governor, which automatically regulates the action of the meter according to the quantity of water discharged. It is practically an automatic cut-off for controlling the induction and discharge according as more or less water is drawn off from one or more spigots in the building where the meter is located. The water flows through and actuates the governor by rise and fall within a suitable receptacle, thereby acting directly to open or close the valves that control the flow.

In accompanying drawings, Figure 1 is a perspective view of my improved meter, portions being removed or broken away to better show the construction. Fig. 2 is a vertical section of the same without the dial recording mechanism. Fig. 3 is a horizontal section of the meter on line *x x*, Fig. 2. Fig. 4 illustrates the arrangement of the meter and its connection with the service-pipe and a discharge-spigot.

In Figs. 1, 2, 3 the cocks E T T' are shown constructed with narrow passages; but in practice the latter will be of the same diameter as the pipes, which will be provided with enlarged sockets to accommodate them.

The eduction-governor constituting the main feature of novelty, it is described hereinafter with corresponding particularity, and the other parts are described more in detail in an application filed by me February 17, 1881, for a recording mechanism for spirit-meters, patented July 5, 1881.

The meter being placed at the top or in the upper portion of the dwelling or other building to which water is supplied, the service or supply pipe A, Figs. 1 and 4, delivers the water into the cylinder or receptacle B, which forms part of an induction-governor, whose remaining portions are a float, C, a lever, D, of the third class, to which it is attached, and a weighted (or spring) plug valve or cock, E, which is placed in the supply-pipe A and operated by said lever—that is to say, when the quantity of water supplied to the cylinder B exceeds the discharge therefrom the float C is raised, but when water is drawn off it falls, which causes a corresponding movement of the lever D, thus closing or opening the cock E, and either hindering or allowing acceleration of the flow of water through pipe A. From said receptacle B the water passes through pipe F and lateral branches F', Fig. 3, into the meter or measuring cylinders G G, such passage being controlled by a four-way cock, H, as will be hereinafter explained. The said cylinders are filled alternately, and of course discharged in like manner. In other words, one is always being filled while the other is being emptied. This alternation in direction of the current is produced by the shifting four-way cock H, which is located at the junction of pipe F and its branches F' F', as shown in Fig. 3. Curved lateral arms *a* are attached to the head of this cock to serve as tappets, which are acted on by the pivoted lever K as it is thrown alternately from right to left, and the reverse. Said lever has a spring attachment, *b*, which serves to hold it fixed in either of the two positions which it may assume, and also to throw it quickly into such positions after passing the point which is midway between them—that is to say, the point which is midway between the limits of the movement of the lever. It will be understood, therefore, that the vibration of the lever K shifts the valve H from one diagonal position to the other, and thus causes it to cut off the flow of water into one measuring-cylinder while allowing supply to the other, as will be readily understood by inspection of Fig. 3.

The required movement of lever K is caused by the rise and fall of the floats L L in the meter-cylinders G G, which is communicated through the medium of the lever or beam to which the floats are pivoted and the forked arm M, attached to the pivot c of said beam—that is to say, as the water fills one cylinder and discharges from the other it buoys and raises one float L, while allowing the other to fall. Consequently the beam N oscillates so long as the water flows. The discharge of the contents of the meter-cylinders G is made alternately through the same pipe F and laterals F' F' as the supply is received, and thence through the nozzle O into the receptacle P, whence the water passes into the pipe Q, that distributes it through the building. (See Figs. 1 and 4.) The oscillation of the beam N operates dial registering mechanism shown in Fig. 1 through the medium of pawls that are pivoted to said beam and act on a ratchet-wheel, whose shaft is suitably geared with the registering mechanism proper.

The cylinder P contains a float, R, attached to a bent lever, S, of the third class. The free end of said lever is connected by a link, d, with the arm e of the cock T, that controls the eduction from the meter-cylinder G. The cock T is also connected by means of a bar, f, with another cock, T', located in pipe F between the induction-governor cylinder B and the four-way cock H, so that both cocks open or close simultaneously, thus allowing discharge from or cutting off supply to the meter-cylinders G G, as shown in Fig. 2, so that the water flows freely from the governor-cylinder B into the meter-cylinders G, and thence into the receptacle P.

The operation of the meter as a whole and the special functions of individual parts may be further illustrated as follows: If the induction-governor B C D were dispensed with, the meter would operate successfully only so long as the discharge at the spigots equals the inflow through pipe A; but whenever the discharge at the spigots should be either wholly or partially arrested, the inflow continuing, the water would accumulate in the meter-cylinders G and overflow the floats L, thus rendering the measurement inaccurate, since the cylinders and floats are necessarily so gaged relative to each other that a definite quantity—say a gallon—is measured when the water raises the float to a certain height without overflowing it.

If the cock T' be dispensed with, the measurement would also be inaccurate, because one of the meter-cylinders G would continue to fill after the discharge from the other had been cut off by closing cock T, so that an undue quantity of water would accumulate therein—that is to say, a sufficient quantity to overflow the float in such cylinder, and that excess could not be measured. If, on the other hand, the cock T be dispensed with, the discharge of one of the meter-cylinders would be continued until it is empty, while the supply would be cut off from the other by cock T', and thus again inaccurate measurement would result.

The operation of the induction-governor is indirectly and that of the cocks T T' directly dependent upon the eduction-governor P R S. The successful operation of the meter as a whole is therefore dependent upon the latter, since it serves as an automatic cut-off, regulating not only the discharge from the meter, but also the first inflow, and the subsequent supply to the meter-cylinders as well. If the discharge-pipe Q have ten spigots attached, then the supply-pipe A should have at least an equal and preferably a greater diameter or capacity, in order that the quantity of water supplied to the meter may be sufficient to allow simultaneous discharge from all the spigots, if required. If, then, all the spigots be opened at one time, the water in the eduction-governor receptacle P will be drawn off, so that the float R therein will fall and completely open the cocks T and T'—in other words, open them to their full capacity—so that the water will flow in full stream into and from the meter-cylinders G and governor-receptacle P. The water in the induction-governor receptacle B being thus drawn off, the float C necessarily falls also, and the cock E thus being opened like the others, T T', a full stream has, so to speak, free course through the machine. In other words, the meter then works up to its full capacity. If, however, only a portion—say one—of the ten spigots be discharging at one time, it is obvious that but one-tenth of the capacity of the meter and its supply and discharge pipes would be availed of, and in such case the floats R and C would fall but one-tenth the distance required in the previous instance, and the cocks T T' and E open but one-tenth. Similarly, if five spigots discharge simultaneously, the meter would run to one-half its capacity, and the floats would fall and cocks open one-half the distance they do when ten spigots are open. In short, the governor P R S perfectly and automatically regulates the action of the meter according to the quantity of water discharged, controlling the induction and eduction of the meter-cylinders, and thereby also the recording mechanism, so that a false record is impossible; and this is done without being affected by variations in the head or pressure of water in the main and service-pipe. The meter is therefore subject to no irregularity of action such as constitutes the chief objection to wheel and piston meters, but is always uniform according to the discharge.

I will also here note a fact from which I derive a great advantage—to wit, in all cases where meters are operated by the pressure of water, it is obvious they retard the force of the current or flow in the service-pipe to a greater or less degree, and in many instances this retardation is sufficient to prevent any discharge from spigots in the upper stories of a building, whereas my meter offers no obstruction whatever to the force of the current, but allows it full effect. I will also remark that, in order to still further promote the free flow of water in the service-pipe, I propose to not only make use of one having an unusually large diameter, but to carry it up with few or no abrupt bends or angles from the main to the place where it is attached to the meter, since a pipe of small diameter and making sharp turns greatly retards the passage of the water, owing to friction. By use, therefore, of such a service-pipe and my improved form of meter located at the highest point in a building where the water is required to be distributed, the annoyances and difficulties incident to water service and registration in cities and towns where the pressure has considerable variation are overcome in every instance, or wherever there is sufficient head in the main to deliver the water; and, further, the location of the meter insures a discharge at any spigot at any time, since the drawing off from one in a lower story cannot prevent it from another in an upper story, as in the case where the direct pressure of water from the main is relied upon.

What I claim is—

1. The combination, with liquid-measuring cylinders and registering mechanism connected therewith, of a governor which automatically regulates the discharge from said cylinders—that is to say, a governor which operates automatically to allow discharge from the measuring cylinder when liquid is drawn off from the distributing-pipe and cuts off said discharge when the flow from the distributing-pipe is arrested—substantially as hereinbefore set forth.

2. The combination, with meter-cylinders and pipes leading to and from the same, and registering mechanism, of a governor which operates automatically to simultaneously shut off or allow the supply and discharge of the meter, substantially as specified.

3. The combination of the eduction governor consisting of a water-receptacle and contained float, the lever, and cocks T and T′, the meter-cylinders, and pipe for discharging their contents into said governor-receptacle, substantially as shown and described.

4. The combination, with the induction-governor C D E, the meter-cylinders G G, and pipes F F′ F″, connecting them, and arranged as specified, of the eduction-governor P R S and cocks T T′, connected therewith and arranged to regulate supply and discharge of said meter-cylinders, as shown and described.

J. LEEDE.

Witnesses:
AMOS W. HART,
SOLON C. KEMON.